United States Patent [19]

Hopkins et al.

[11] Patent Number: 4,688,617
[45] Date of Patent: Aug. 25, 1987

[54] PNEUMATIC TIRE

[75] Inventors: William M. Hopkins, Hudson; Perry W. Bell, North Lawrence; Russell A. Carolla, Akron; Jon A. Gerspacher, Copley; Peter R. Shepler, Cuyahoga Falls; Thomas H. Wells, Akron, all of Ohio

[73] Assignee: The Goodyear Tire & Rubber Company, Akron, Ohio

[21] Appl. No.: 715,240

[22] Filed: Mar. 25, 1985

[51] Int. Cl.$^4$ .............................................. B60C 9/04
[52] U.S. Cl. .................................. 152/554; 152/552; 152/559
[58] Field of Search ............... 152/454, 548, 552, 554, 152/560, 538, 559, 558

[56] References Cited

U.S. PATENT DOCUMENTS

| | | | |
|---|---|---|---|
| 3,062,258 | 11/1962 | Maiocchi | 152/552 X |
| 3,161,220 | 12/1964 | Beckadolf | 152/536 |
| 3,286,758 | 11/1966 | Svereckis et al. | 152/554 |
| 3,506,052 | 4/1970 | Wittneben | 152/552 X |
| 3,580,318 | 5/1971 | Menell et al. | 152/526 |
| 3,581,793 | 6/1971 | Wittneben | 152/551 |
| 3,631,913 | 1/1972 | Boileau | 152/454 |
| 3,760,858 | 9/1973 | Grossett | 152/554 X |
| 3,861,439 | 1/1975 | Boileau | 152/209 R |
| 3,994,329 | 11/1976 | Masson et al. | 152/517 |
| 4,042,002 | 8/1977 | Alsobrook | 152/551 |
| 4,166,491 | 9/1979 | Mezzanotte | 152/531 |
| 4,231,409 | 11/1980 | Mezzanotte | 152/454 |
| 4,243,450 | 1/1981 | Ferrary | 156/123 |

FOREIGN PATENT DOCUMENTS

| | | |
|---|---|---|
| 975379 | 5/1951 | Fed. Rep. of Germany . |
| 1089155 | 9/1960 | Fed. Rep. of Germany . |
| 1605639 | 1/1970 | Fed. Rep. of Germany . |
| 1605616 | 3/1971 | Fed. Rep. of Germany . |
| 2854101 | 4/1979 | Fed. Rep. of Germany . |
| 2804958 | 9/1979 | Fed. Rep. of Germany . |
| 1505059 | 5/1981 | Fed. Rep. of Germany ...... 152/552 |
| 1412718 | 1/1957 | France . |
| 1221310 | 7/1961 | France . |
| 2368374 | 10/1977 | France . |
| 554459 | 8/1965 | Italy . |
| 628060 | 8/1949 | United Kingdom . |
| 1208984 | 10/1970 | United Kingdom . |
| 1371333 | 10/1974 | United Kingdom . |
| 2017016 | 10/1979 | United Kingdom . |
| 1590193 | 5/1981 | United Kingdom . |
| 2102354 | 2/1983 | United Kingdom . |

Primary Examiner—Donald E. Czaja
Assistant Examiner—Ramon R. Hoch
Attorney, Agent, or Firm—L. R. Drayer

[57] ABSTRACT

A pneumatic vehicle tire (10) has a plurality of radial carcass plies (16,18). One of the carcass plies (16) has a high turn-up that ends under the belt reinforcing structure (42). The other carcass ply (18) has its lateral edges (34,36) located radially inwardly of the widest part of the tire (SD).

10 Claims, 2 Drawing Figures

PNEUMATIC TIRE

BACKGROUND OF THE INVENTION

The present invention relates generally to pneumatic tires, and more specifically to multi-ply radial ply pneumatic tires.

A pneumatic tire in accordance with the present invention is believed to exhibit generally lower sensitivity to load transfer during turning and rapid deceleration than prior art radial ply tires.

Prior art multi-ply radial ply tires have carcass plies that are turned up around the beads with the lateral edges of the carcass plies located radially inwardly of the lateral edges of the tread reinforcing structure. However; in a tire according to the present invention the tread reinforcing structure overlaps the turned-up portion of one of the carcass plies.

SUMMARY OF THE INVENTION

There is provided in accordance with one aspect of the invention a pneumatic tire comprising a pair of axially spaced apart annular beads with a plurality of circumferentially extending radially superposed carcass plies extending between said beads. Each of the carcass plies has a central portion and a pair of lateral edge portions. A lateral edge portion of each carcass ply is folded axially and radially outwardly around each of the beads. A circumferentially extending tread reinforcing structure is disposed radially outwardly of the carcass plies. The lateral edges of all but one of the carcass plies being disposed radially inwardly of the axially widest part of the tire. The lateral edges of said one carcass ply are axially spaced apart from one another and are interposed between the central portion of said one carcass ply and said tread reinforcing structure. Each carcass ply comprises a plurality of substantially parallel reinforcing elements which are oriented at angles of at least 70° but less than 90° with respect to circumferential lines of the tire in the crown portion of the tire.

There is provided in accordance with another aspect of the invention a pneumatic tire comprising a pair of axially spaced apart annular beads and only two circumferentially extending radially superposed carcass plies extending between said beads. Each carcass ply has a central portion and a pair of lateral edge portions. A lateral portion of each carcass ply is folded axially and radially outwardly around each of said beads. A circumferentially extending tread reinforcing structure is disposed radially outwardly of both of said carcass plies. The lateral edges of the radially outermost carcass ply are disposed radially inwardly of the widest part of the tire. The lateral edges of the radially innermost carcass ply are axially spaced apart from one another and interposed between the central portion of said radially innermost carcass ply and said tread reinforcing structure. The carcass plies each comprise a plurality of substantially parallel reinforcing elements which are oriented at angles of at least 70° but less than 90° with respect to circumferential lines of the tire in the crown portion of the tire.

BRIEF DESCRIPTION OF THE DRAWINGS

Other aspects of the invention will become apparent from the following description when read in conjunction with the accompanying drawings wherein.

DETAILED DESCRIPTION OF THE INVENTION

Figure 1:
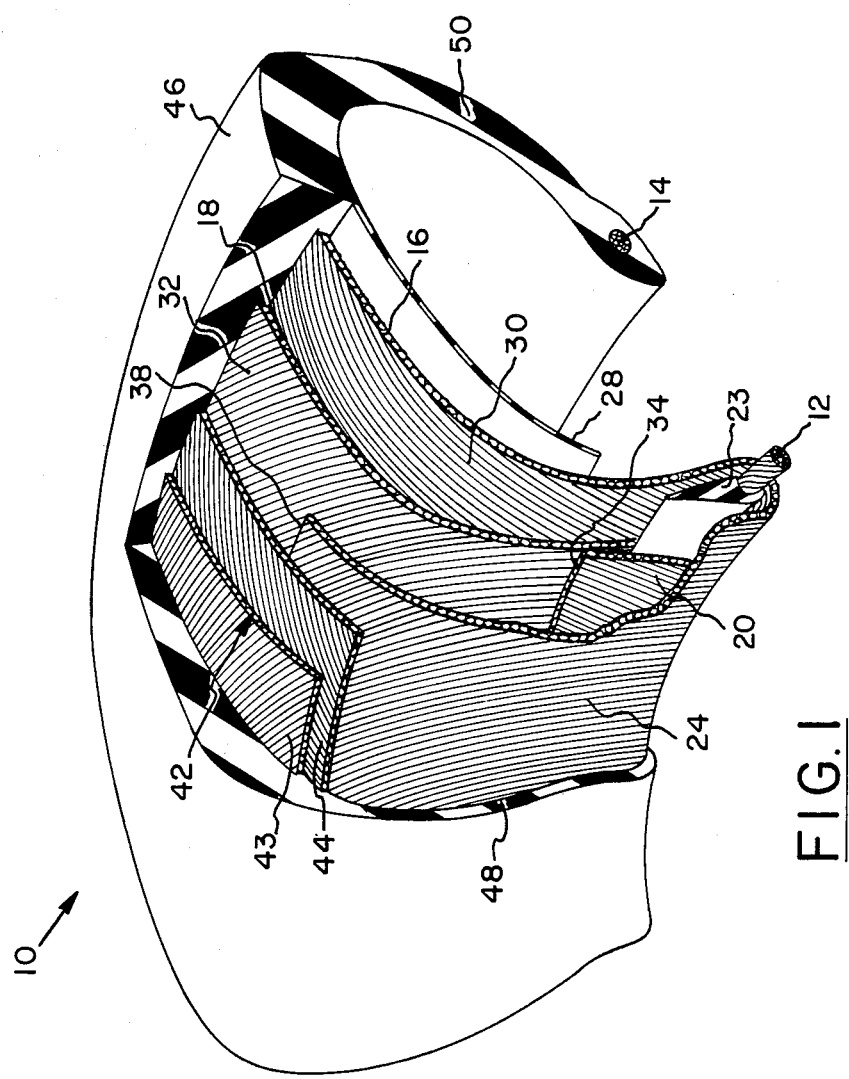
FIG. 1 is a perspective view of a section of a tire, partially broken away to reveal the internal structure of the tire.
Figure 2:
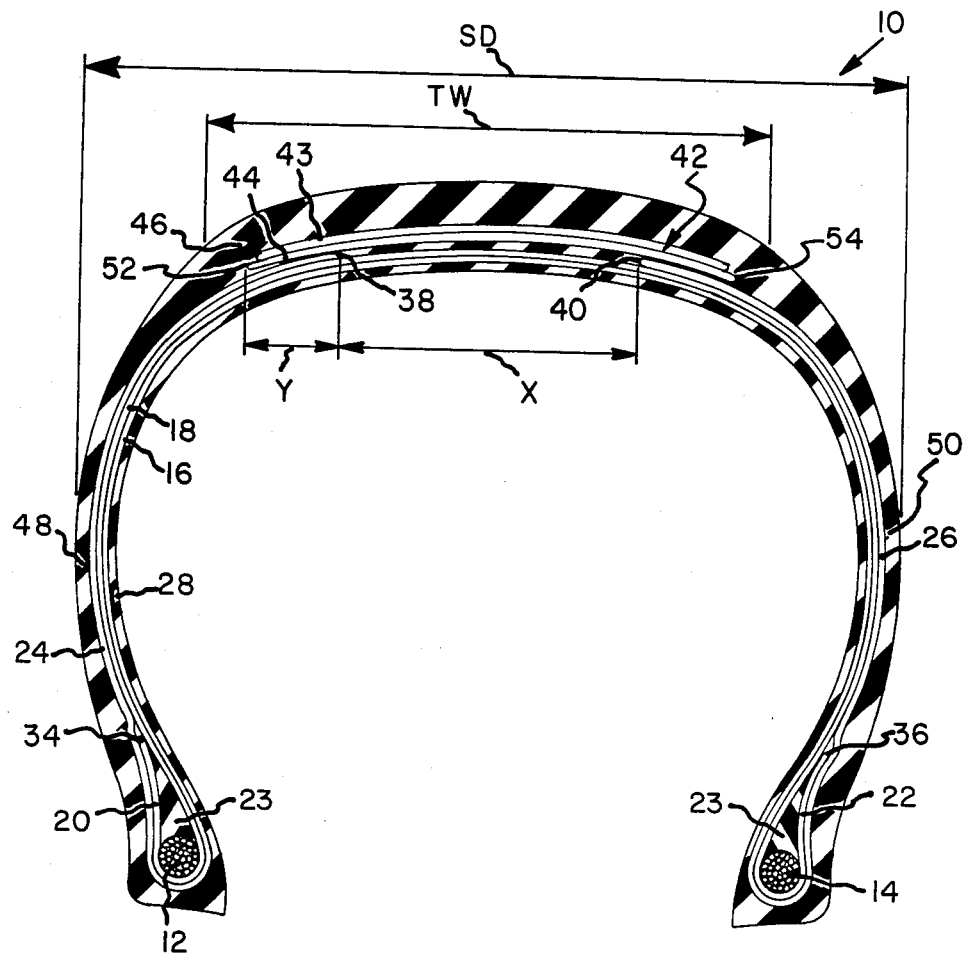
FIG. 2 is a radial cross-section view of the tire illustrated in FIG. 1.

There is illustrated in FIGS. 1 and 2 a pneumatic tire 10 manufactured in accordance with a preferred embodiment of the present invention. The tire 10 is a multi-ply radial ply tire. As used herein, "multi-ply radial ply tire" shall mean a tire in which the reinforcing elements of the carcass-reinforcing plies are oriented at an angle of at least 70 degrees but less than 90 degrees relative to the circumferential lines of the tire in the crown portion of the tire. As used herein, a "circumferential line" of a tire shall mean a circle lying in a plane that is perpendicular to the axis of rotation of a tire and having its center located on the axis of rotation of the tire. As used herein, the "mid-circumferential plane" of a tire shall mean a plane that is perpendicular to the axis of rotation of a tire and located midway between the sidewalls of a tire at their greatest axial width. "Axial" and "axially" are used herein to refer to lines or directions that are parallel to the axis of rotation of a tire, such that "axially inwardly" refers to a direction going from a sidewall of the tire toward the mid-circumferential plane of the tire and "axially outwardly" refers to a direction going from the mid-circumferential plane of the tire toward a sidewall of the tire. "Radial" and "radially" are used herein to refer to planes which contain the axis of rotation of a tire, such that "radially outwardly" refers to a direction going from the axis of rotation of the tire toward the tread portion of the tire and "radially inwardly" refers to a direction going from the tread portion of the tire toward the axis of rotation of the tire.

The tire 10 has a pair of axially spaced apart, substantially inextensible, annular beads 12,14. While the beads are shown with circular cross-sections, this is not believed to be essential to the invention, and the beads could have hexagonal or other well known cross-sectional shapes.

A plurality of circumferentially extending radially superposed carcass plies 16,18 (preferably only two) extend between the annular beads 12,14. Each of the carcass plies has a central portion disposed between the two beads and a pair of lateral edge portions. A lateral edge portion 20,22,24,26 of each of the carcass plies is folded axially and radially outwardly around each of the beads. A triangular shaped elastomeric apex strip 23 may be disposed between each bead and the fold of the radially outermost carcass ply 18.

A layer 28 of a low permeability material, commonly referred to as an innerliner, may be disposed radially inwardly of the carcass plies to aid in retaining the inflation gas inside of the tire.

Each of the carcass plies 16,18 comprises a plurality of substantially parallel reinforcing elements embedded in an elastomeric substance. Tires have been manufactured according to the invention with carcass ply reinforcing elements of nylon and polyester, but it is believed that other materials well known in the art could also be used. The reinforcing elements of each carcass ply are oriented at angles of at least 70° but less than 90°, preferably between 70° and 80°, with respect to circumferential lines of the tire in the crown portion of the tire. It is clear from FIG. 1 that the reinforcing elements 30,32 of the carcass plies are preferably oriented such that the reinforcing elements of any carcass ply have an angular orientation that is opposite in sign to the angular orientation of the reinforcing elements of the next adjacent carcass ply. Preferably the angular orientation of the reinforcing elements of all of the carcass plies are the same, or at least substantially the same, in the crown portion of the tire. It is understood that while the preferred embodiment illustrated in the figures of the drawing has only two carcass plies, a tire could be manufactured according to the invention having more than two carcass plies. The lateral edges 34,36 of all but one of the carcass plies are disposed radially inwardly of the axially widest part of the tire SD, which is also known as the section width of the tire. The lateral edges 38,40 of only one carcass ply are axially spaced apart from one another and interposed between the central portion of said one carcass ply and a circumferentially extending tread reinforcing structure 42 that is disposed radially outwardly of all of the carcass plies. In the preferred embodiment the radially outermost carcass ply 18 has a narrower unfolded width, and therefore radially lower lateral edges, than the radially innermost carcass ply 16. However; it is understood that a tire according to the invention could have a radially outermost carcass ply with its lateral edges located in the crown portion of the tire, while the radially innermost carcass ply, (or plies), has lateral edges that are located radially inwardly of the widest part of the tire SD.

The tread reinforcing structure 42 illustrated in the drawing comprises a plurality of belt plies 43,44 of the type well known in the art. Each belt ply comprises substantially parallel reinforcing elements embedded in an elastomeric substance. The reinforcing elements of the belt plies may be selected from any of the belt reinforcing materials that are well known in the art, in accordance with good engineering practice. While the belt plies 43,44 shown in the drawing are unfolded plies, it is believed that any structure of folded, combined folded and unfolded, overlays, edge strips, and so forth selected, regardless of the number of belt plies, in accordance with good engineering practice could be employed in a tire according to the present invention.

An elastomeric tread portion 46 extends circumferentially about the tire, radially outwardly of the tread reinforcing structure 42. It is understood that the tread portion of a tire according to the invention may have a pattern of grooves, ribs, lugs, buttons, and so forth in accordance with the expected operating environment of the tire. For simplicity of illustration the tire shown in the drawings has a plain tread design. The tread has a tread width TW which is measured at the widest part of a footprint of the tire when the tire is mounted on the specified rim, inflated to design inflation pressure, and subjected to the design load.

Elastomeric sidewalls 48,50 extend radially inwardly from the tread 46 to the bead portions of the tire. Preferably, the thickness of the sidewalls is kept to a minimum to prevent heat retention and not inhibit the flexing characteristics of the carcass plies.

The axial distance X between the lateral edges 38,40 of the high turn up carcass ply (in the preferred embodiment the radially innermost carcass ply 16) should be in the range of 8% to 85% of the section width SD of the tire. As used herein, the section width of a tire is the widest axial width of a tire that is mounted on a specified rim, inflated to the design inflation pressure and subjected to the design load. Preferably the axial distance X between the lateral edges of the high turn-up carcass ply is in the range of 50% to 80% of the section width. Put another way, the axial distance X between the lateral edges of the high turn-up carcass ply 16 should preferably be at least 12.7 mm (½ inch). It is important that the amount of axial overlap Y of the tread reinforcing structure with the lateral edge portions of the high turn-up carcass ply be large enough that a transition zone is provided to balance the radial, lateral, and tangiential forces experienced during cornering and sudden braking in a particular operating environment. Each lateral edge 38,40 of the high turn-up carcass ply 18 should preferably be spaced apart from the nearest lateral edge 52,54 of the tread reinforcing structure 42 by an axial distance Y in the range of 2% to 40% of the tread width TW of the tire. Put another way, each lateral edge of the high turn-up carcass ply should be spaced apart from the nearest lateral edge of the tread reinforcing structure by an axial distance Y of at least 5 mm (0.2 inch). As used herein the lateral edges of a tread reinforcing structure are located at the greatest axial extent of any of the plies of the tread reinforcing structure.

While certain representative embodiments and details have been shown for the purpose of illustrating the invention, it will be apparent to those skilled in the art that various changes and modifications may be made therein without departing from the spirit or scope of the invention.

What is claimed is:

1. A pneumatic tire comprising a pair of axially spaced apart annular beads, a plurality of circumferentially extending radially superposed carcass plies extending between said beads, each of said carcass plies having a central portion and a pair of lateral edge portions, a lateral edge portion of each carcass ply being folded axially and radially outwardly around each of said beads, a circumferentially extending tread reinforcing structure disposed radially outwardly of the carcass plies, the lateral edges of all but one of the carcass plies being disposed radially inwardly of the axially widest part of the tire, the lateral edge portions of said one carcass ply not being overlapped with respect to one another and the lateral edges of said one carcass ply being axially spaced apart from one another interposed between the central portion of said one carcass ply and said tread reinforcing structure, said carcass plies each comprising a plurality of substantially parallel reinforcing elements which are oriented at angles of at least 70° but less than 90° with respect to circumferential lines of the tire in the crown portion of the tire.

2. A pneumatic tire as described in claim 1 wherein the axial distance between the lateral edges of said one carcass ply is in the range of 8% to 85% of the section width of said tire.

3. A pneumatic tire as described in claim 1 wherein said tread reinforcing structure has a pair of lateral edges, each lateral edge of said one carcass ply being spaced apart from the nearest lateral edge of the tread reinforcing structure by an axial distance in the range of 2% to 40% of the tread width of said tire.

4. A pneumatic tire as described in claim 1 wherein the axial distance between the lateral edges of said one carcass ply is at least 12.7 mm.

5. A pneumatic tire as describd in claim 1 wherein said tread reinforcing structure has a pair of lateral edges, each lateral edge of said one carcass ply being spaced apart from the nearest lateral edge of the tread reinforcing structure by an axial distance of at least 5 mm.

6. A pneumatic tire as described in claim 4 wherein said tread reinforcing structure has a pair of lateral edges, each lateral edge of said one carcass ply being spaced apart from the nearest lateral edge of the tread reinforcing structure by an axial distance of at least 5 mm.

7. A pneumatic tire as described in any one of claims 1 through 6 wherein the reinforcing elements of the carcass plies are oriented such that the reinforcing elements of any carcass ply have an angular orientation that is opposite in sign to that of the angular orientation of the reinforcing elements of each next adjacent carcass ply.

8. A pneumatic tire comprising a pair of axially spaced apart annular beads, exactly two circumferentially extending radially superposed carcass plies extending between said beads, each carcass ply having a central portion and a pair of lateral edge portions, a lateral edge portion of each carcass ply being folded axially and radially outwardly around each of said beads, a circumferentially extending tread reinforcing structure disposed radially outwardly of both of said carcass plies, the lateral edges of the radially outermost carcass ply being disposed radially inwardly of the axially widest part of the tire, the lateral edge portions of the radially innermost carcass ply not being overlapped with respect to one another and the lateral edges of the radially innermost carcass ply being axially spaced apart from one another and interposed between the central portion of said radially innermost carcass ply and said tread reinforcing structure, said carcass plies each comprising a plurality of substantially parallel reinforcing elements which are oriented angles of at least 70° but less than 90° with respect to circumferential lines of the tire in the crown portion of the tire.

9. A pneumatic tire as described in claim 8 wherein said tread reinforcing structure has a pair of lateral edges, each lateral edge of said radially innermost carcass ply being spaced apart from the nearest lateral edge of the tread reinforcing structure by an axial distance of at least 5 mm.

10. A pneumatic tire according to either of claims 8 or 9 wherein the reinforcing elements of the carcass plies are oriented such that the reinforcing elements of each carcass ply have an angular orientation that is opposite in sign to that of the angular orientation of the reinforcing elements of the other carcass ply.

* * * * *